United States Patent
Tsai et al.

(10) Patent No.: US 7,098,616 B1
(45) Date of Patent: Aug. 29, 2006

(54) CONTROL DEVICE FOR A MOTOR UNIT OF A FOOD PROCESSOR

(75) Inventors: Yu-Feng Tsai, Tainan (TW); Fu-Wen Yu, Tainan (TW); Chia-Cheng Lin, Tainan (TW)

(73) Assignee: Ya Horng Electronic Co., Ltd., Tainan (TW)

(*) Notice: Subject to any disclaimer, the term of this patent is extended or adjusted under 35 U.S.C. 154(b) by 0 days.

(21) Appl. No.: 11/174,919

(22) Filed: Jul. 5, 2005

(51) Int. Cl.
*H02P 1/54* (2006.01)
(52) U.S. Cl. .................. 318/60; 318/717; 318/63; 318/86; 318/54
(58) Field of Classification Search ............ 318/54, 318/57, 60, 717, 63, 86, 703, 757, 261
See application file for complete search history.

(56) References Cited

U.S. PATENT DOCUMENTS

2004/0163175 A1* 8/2004 Vogel et al. ............... 5/620
2005/0073279 A1* 4/2005 Fenley ..................... 318/717

* cited by examiner

*Primary Examiner*—Karen Masih
(74) *Attorney, Agent, or Firm*—Curatolo Sidoti Co. LPA

(57) ABSTRACT

A control device includes a control module controlling a polarity switching unit connected electrically to a motor unit of a food processor to provide a first current path for an input power signal through the motor unit when the control module is operated in a processing mode, and further controlling the polarity switching unit to provide a second current path for the input power signal through the motor unit when the control module is operated in a braking mode. A power control unit is connected electrically to the motor unit and the control module, and controls the power control unit such that the power control unit reduces an amount of the input power signal that flows through the second current path during a braking period when the control module is operated in the braking mode.

12 Claims, 9 Drawing Sheets

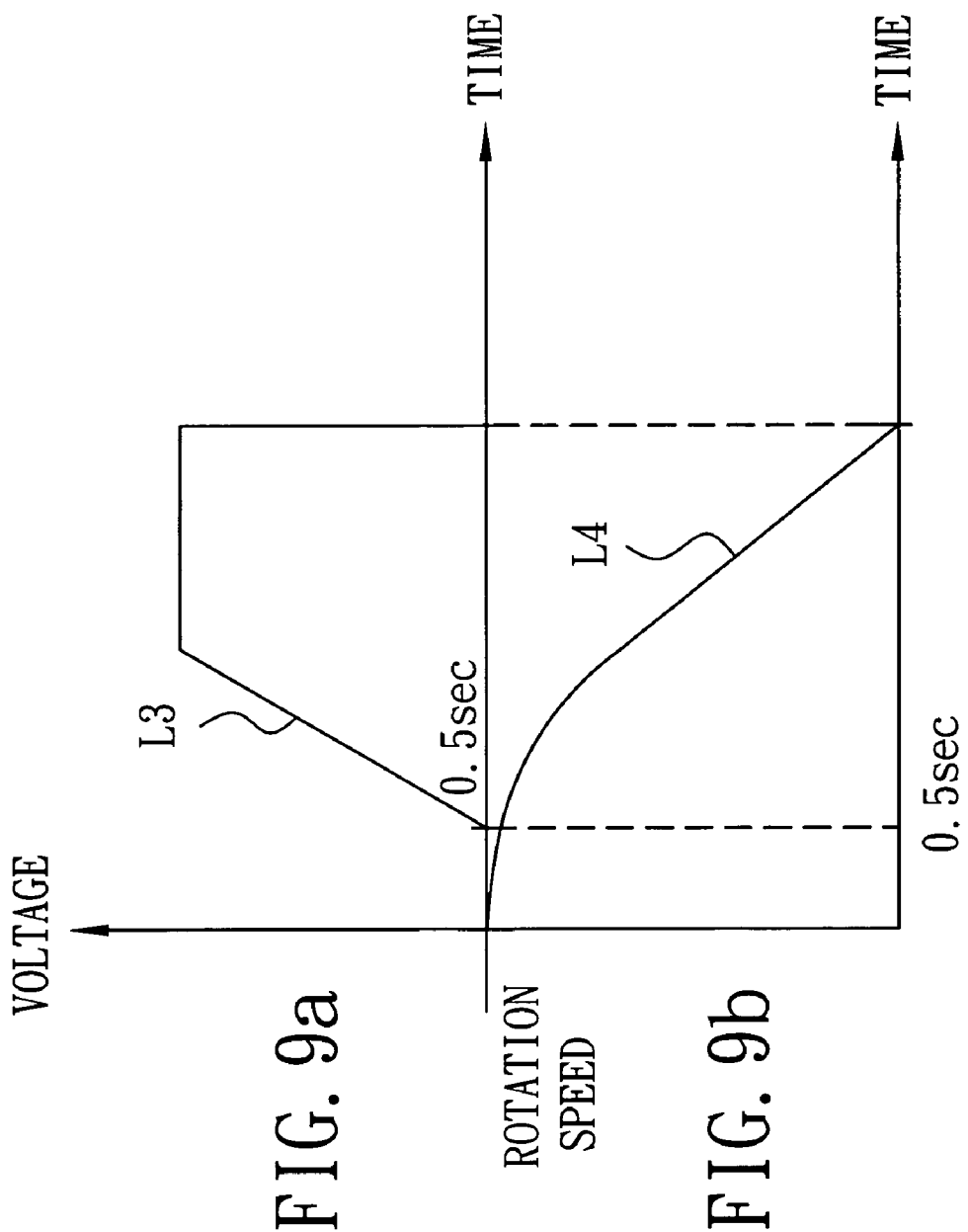

CONTROL DEVICE FOR A MOTOR UNIT OF A FOOD PROCESSOR

BACKGROUND OF THE INVENTION

1. Field of the Invention

The invention relates to a control device, more particularly to a control device for a motor unit of a food processor.

2. Description of the Related Art

In a conventional food processor, a cutting blade member is driven by a motor unit to rotate during a processing period when operating in a processing mode. However, rotation of the cutting blade member does not stop immediately when the conventional food processor is deactivated.

FIGS. 1 and 2 illustrate a conventional control circuit for an alternating current series motor 11 of a food processor (not shown). The motor 11 has two stator coil units 112, 113, and a rotor coil unit 111. The conventional control circuit includes a controller (not shown) operable in a processing mode and a braking mode, and first and second switches 13, 12 interconnecting electrically the stator coil units 112, 113 and the rotor coil unit 111. Each of the first and second switches 13, 12 includes a common node (C), a first switch node (NC) and a second switch node (NO). The first switch nodes (NC) of the first and second switches 13, 12 are connected to each other. The second switch node (NO) of the first switch 13 is connected electrically to one end of the stator coil unit 112 that is connected to one end of the rotor coil unit 111. The common node (C) of the first switch 13 is connected electrically to one end of the stator coil unit 113. The first switch node (NC) of the second switch 12 is connected electrically to the other end of the rotor coil unit 111. The common node (C) of the second switch 12 is connected electrically to the other end of the stator coil unit 113.

When the controller is operated in the processing mode, the first and second switches 13, 12 are controlled by the controller so as to connect the common node (C) to the first switch node (NC) in the first switch 13 and to connect the common node (C) to the second switch node (NO) in the second switch 12, as shown in FIG. 1, so that a first current path indicated by the arrows in FIG. 1 for an alternating current signal (AC) through the motor 11 is generated.

On the other hand, when the controller is operated in the braking mode, the first and second switches 13, 12 are controlled by the controller so as to connect the common node (C) to the second switch node (NO) in the first switch 13 and to connect the common node (C) to the first switch node (NC) in the second switch 12, as shown in FIG. 2, so that a second current path indicated by the arrows in FIG. 2 for a residual power signal in the stator coil unit 113 through the rotor coil unit 111 is generated.

Since a voltage supplied to the rotor coil unit 111 in the second current path has a polarity opposite to that in the first current path, sparks or vibration may occur during the transition from the processing mode to the braking mode.

Furthermore, the residual voltage signal in the stator coil unit 113 is insufficient to stop rotation of the motor 11 within a short amount of time. Therefore, safety during a relatively long braking period cannot be ensured.

SUMMARY OF THE INVENTION

Therefore, the object of the present invention is to provide a control device for a motor unit of a food processor that can provide a smooth and stable braking effect for the motor unit.

According to one aspect of the present invention, there is provided a control device for a motor unit of a food processor. The food processor includes a cutting blade unit driven by the motor unit. The control device comprises:

a control module operable in a processing mode and a braking mode;

a polarity switching unit adapted to be connected electrically to the motor unit and connected electrically to the control module, the control module controlling the polarity switching unit to provide a first current path for an input power signal through the motor unit when the control module is operated in the processing mode, the control module further controlling the polarity switching unit to provide a second current path for the input power signal through the motor unit when the control module is operated in the braking mode; and a power control unit adapted to be connected electrically to the motor unit and connected electrically to the control module, the control module controlling the power control unit such that the power control unit reduces an amount of the input power signal that flows through the second current path during a braking period when the control module is operated in the braking mode.

According to another aspect of the present invention, there is provided a control device for an alternating current series motor having stator and rotor coil units. The control device comprises:

a control module operable in a processing mode and a braking mode;

a polarity switching unit adapted to interconnect electrically the stator and rotor coil units and connected electrically to the control module, the control module controlling the polarity switching unit to provide a first current path for an input power signal through the stator and rotor coil units when the control module is operated in the processing mode, the control module further controlling the polarity switching unit to reverse polarity connections of the rotor coil unit with the stator coil unit so as to result in a second current path for the input power signal through the stator and rotor coil units when the control module is operated in the braking mode; and a power control unit adapted to be connected electrically to the alternating current series motor and connected electrically to the control module, the control module controlling the power control unit such that the power control unit reduces an amount of the input power signal that flows through the second current path during a braking period when the control module is operated in the braking mode.

BRIEF DESCRIPTION OF THE DRAWINGS

Other features and advantages of the present invention will become apparent in the following detailed description of the preferred embodiment with reference to the accompanying drawings, of which:

FIGS. 9a and 9b are plots illustrating respectively a voltage provided by the control module to the motor unit, and the rotation speed of the motor unit corresponding to the voltage during another braking period, wherein the control module provides the voltage after a predetermined time period at the start of the braking period when the control module is operated in the braking mode.

DETAILED DESCRIPTION OF THE PREFERRED EMBODIMENT

Figure 1:
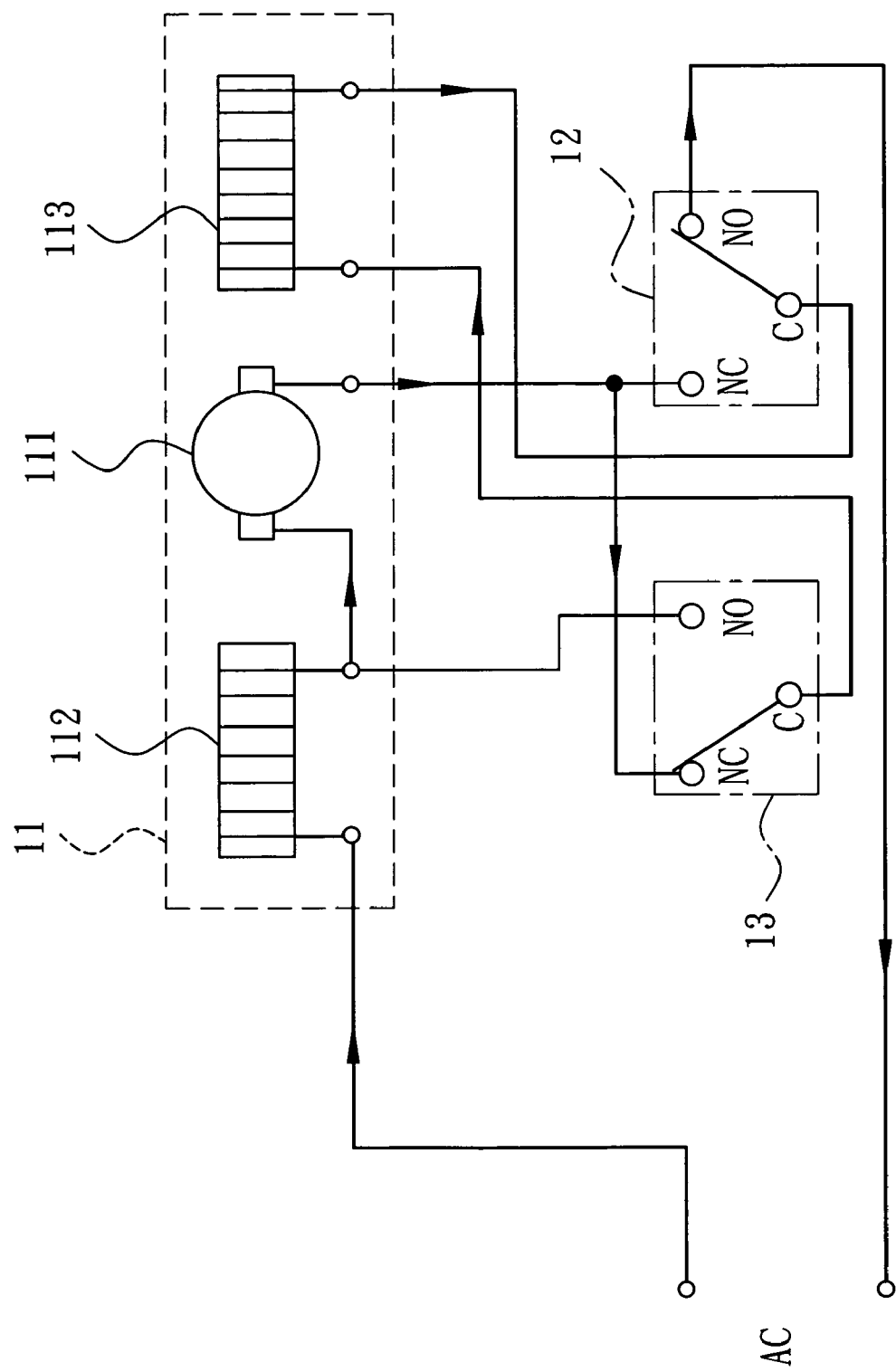
FIG. 1 is a schematic circuit diagram illustrating a conventional control device for a motor unit of a food processor when the conventional control device is operated in a processing mode.
Figure 2:
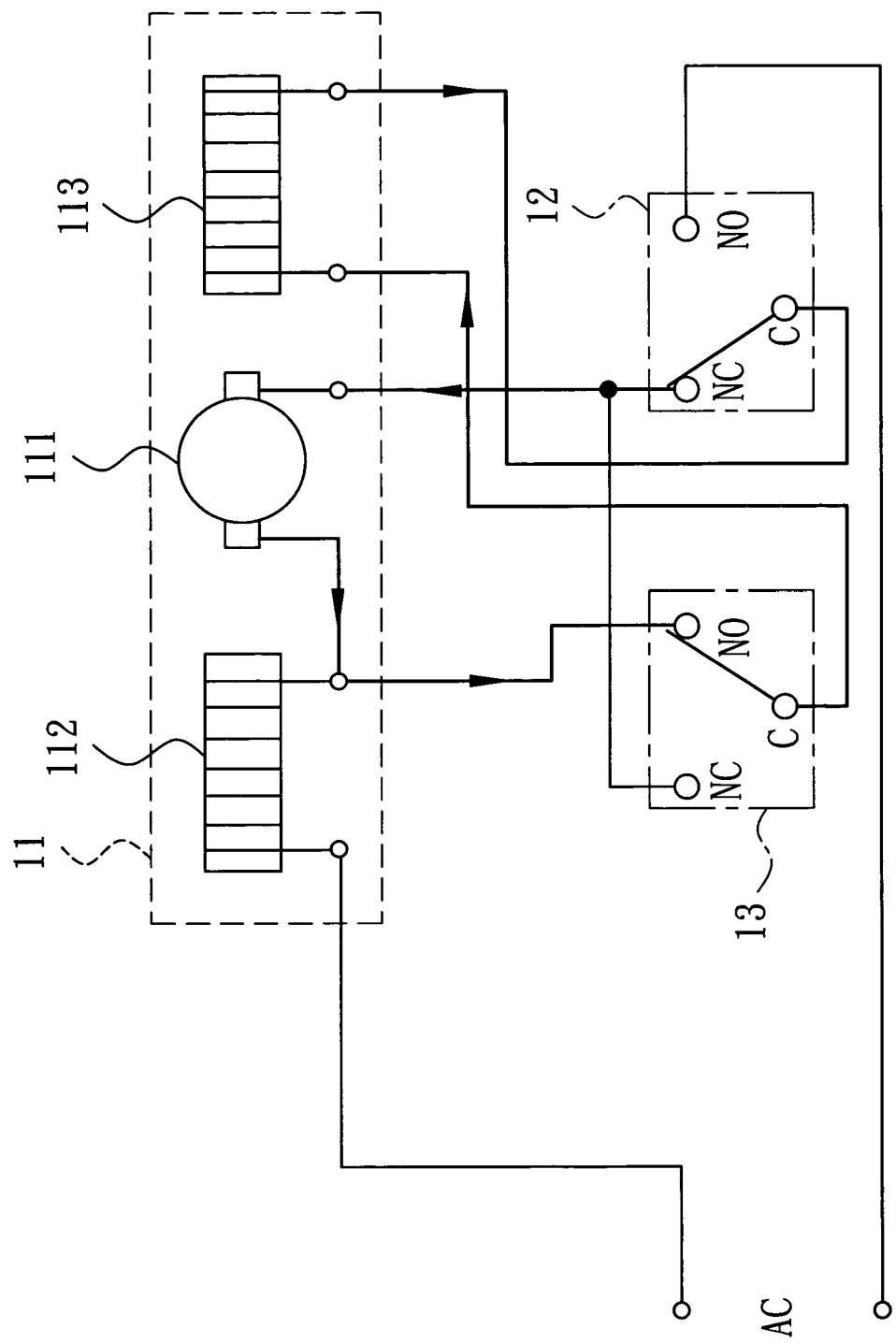
FIG. 2 is a schematic circuit diagram illustrating the conventional control device for the motor unit of the food processor when the conventional control device is operated in a braking mode.
Figure 3:
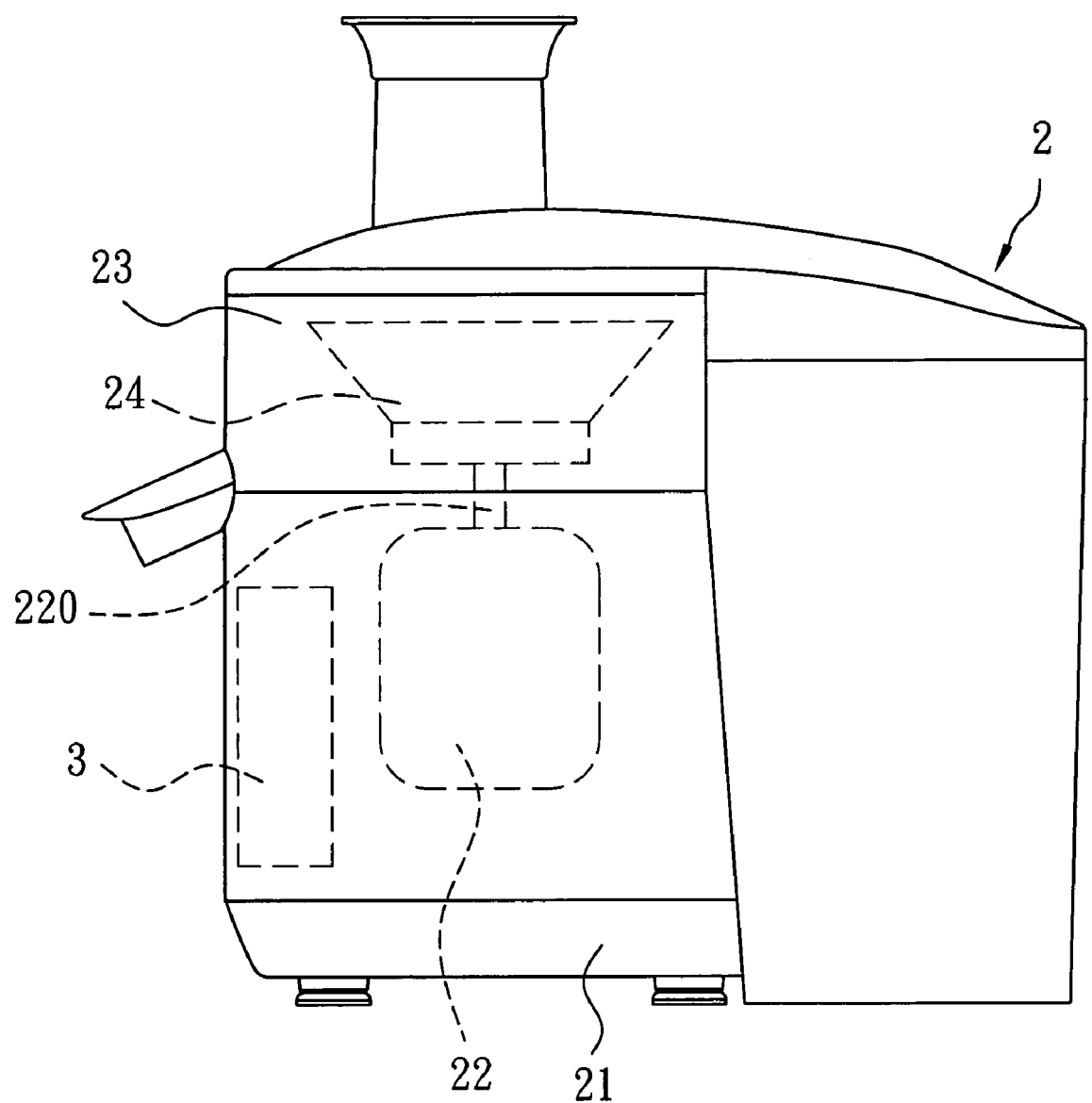
FIG. 3 is a schematic view showing a food processor that incorporates the preferred embodiment of a control device for a motor unit of the food processor according to the present invention.

Referring to FIG. 3, the preferred embodiment of a control device 3 according to the present invention is shown to be adapted for a motor unit 22 of a food processor 2 that includes a motor base 21 mounted with the motor unit 22 therein, a container 23 disposed on the motor base 21, and a cutting blade unit 24 disposed in the container 23 and driven by the motor unit 22 via a rotatable blade driving shaft 220 of the motor unit 22. In this embodiment, the motor unit 22 includes an alternating current series motor that has a rotor coil unit 221 and two stator coil units 222, 223, as shown in FIG. 5.

Figure 4:
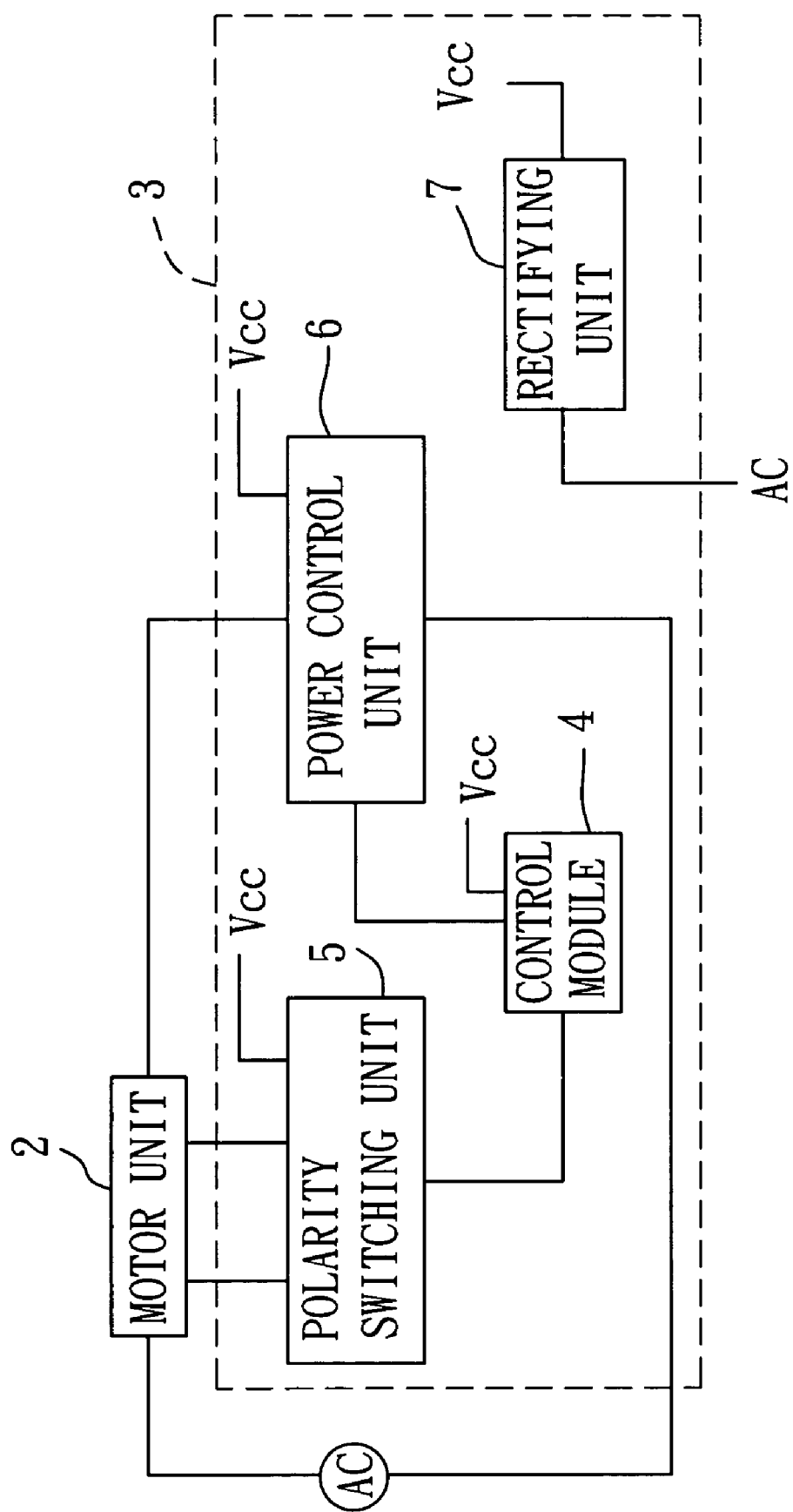
FIG. 4 is a schematic circuit block diagram illustrating the preferred embodiment.
Figure 5:
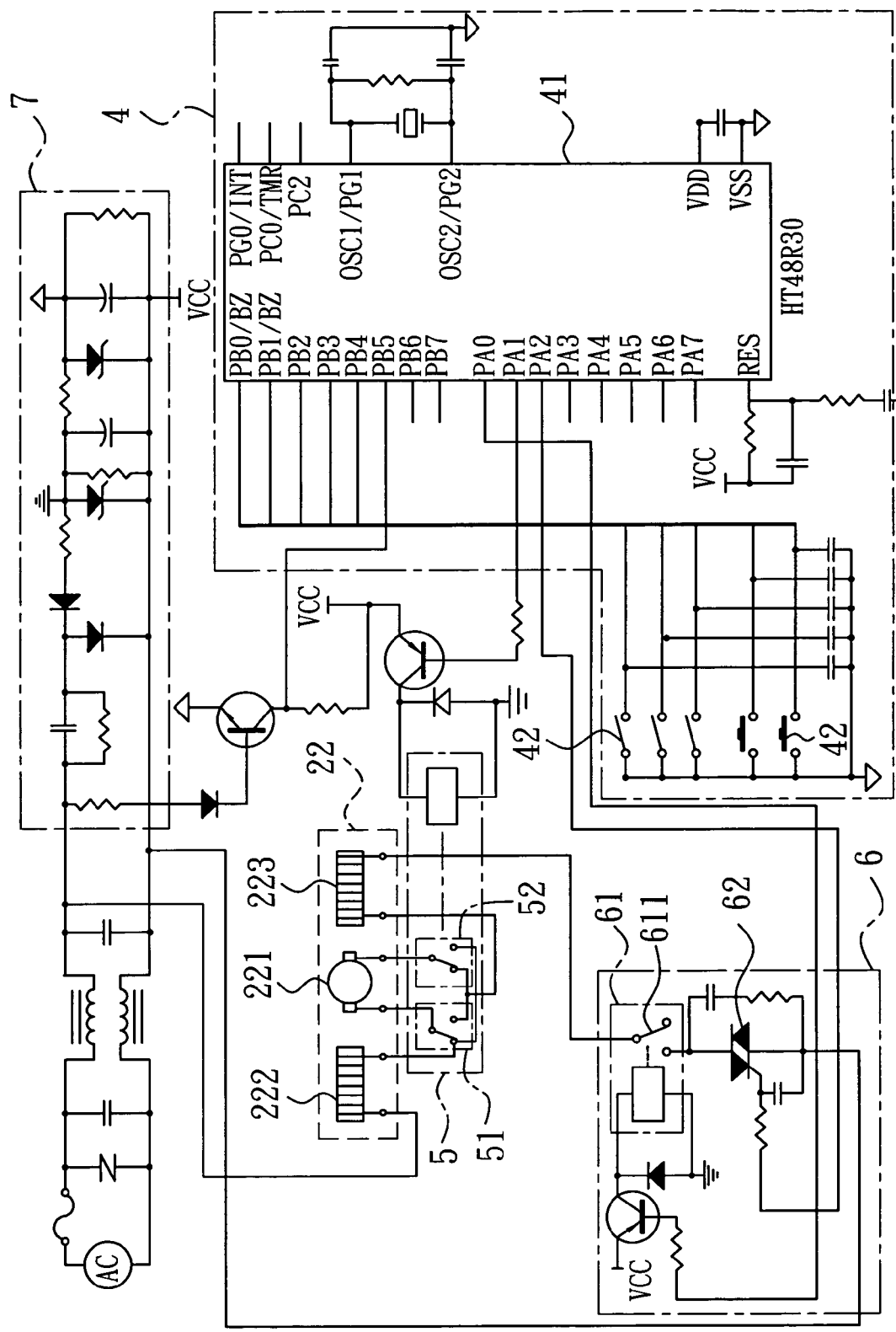
FIG. 5 is a schematic electrical circuit diagram illustrating the preferred embodiment.

Referring to FIGS. 4 and 5, the control device 3 is shown to include a control module 4, a polarity switching unit 5, a power control unit 6, and a rectifying unit 7.

The control module 4 includes a control chip 41 operable in a processing mode and a braking mode via manual operation of a set of operating buttons 42.

Figure 6:
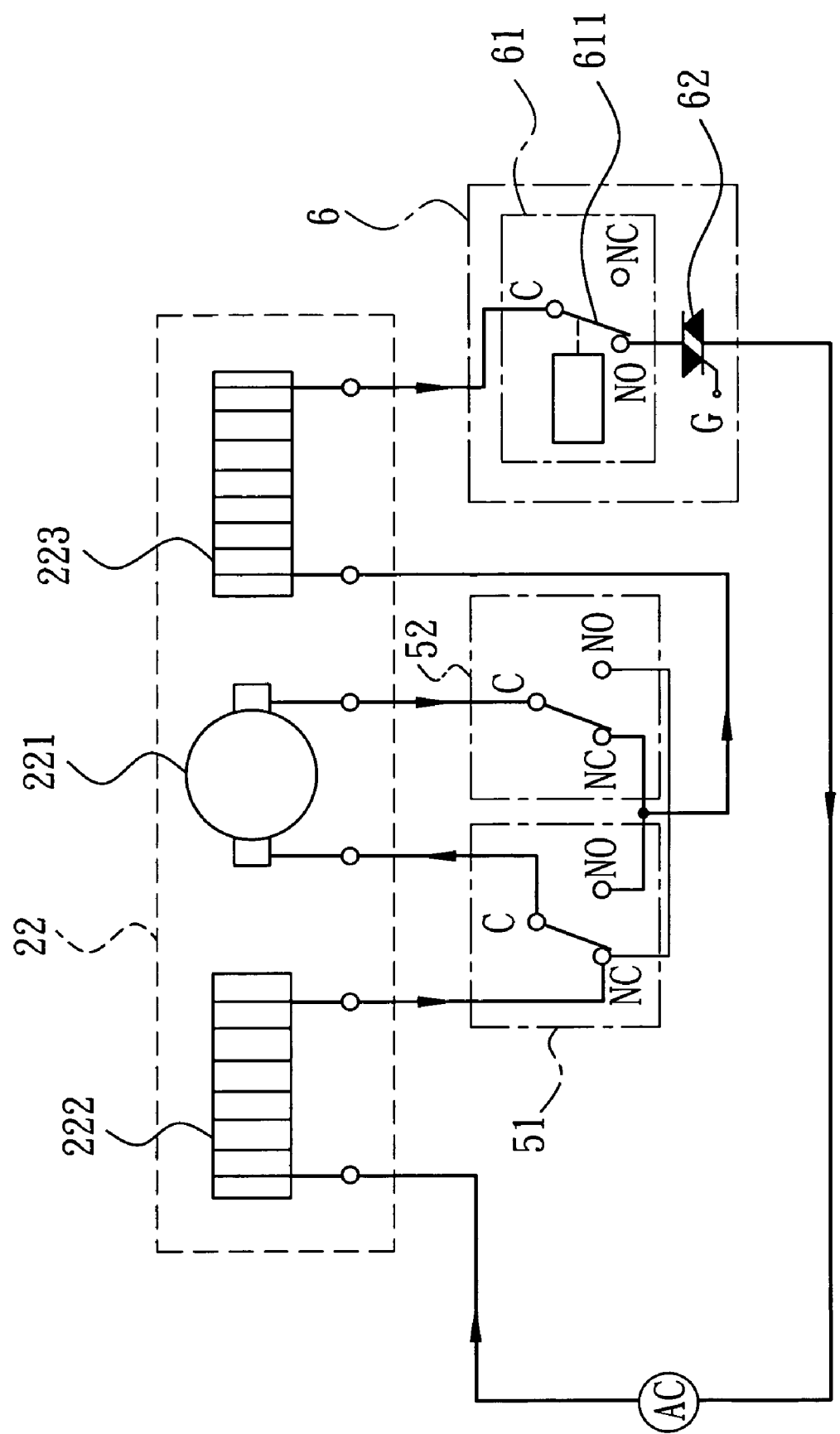
FIG. 6 is a schematic circuit diagram illustrating the motor unit, and a polarity switching unit and a power control unit of the preferred embodiment when a control module thereof is operated in a processing mode.
Figure 7:
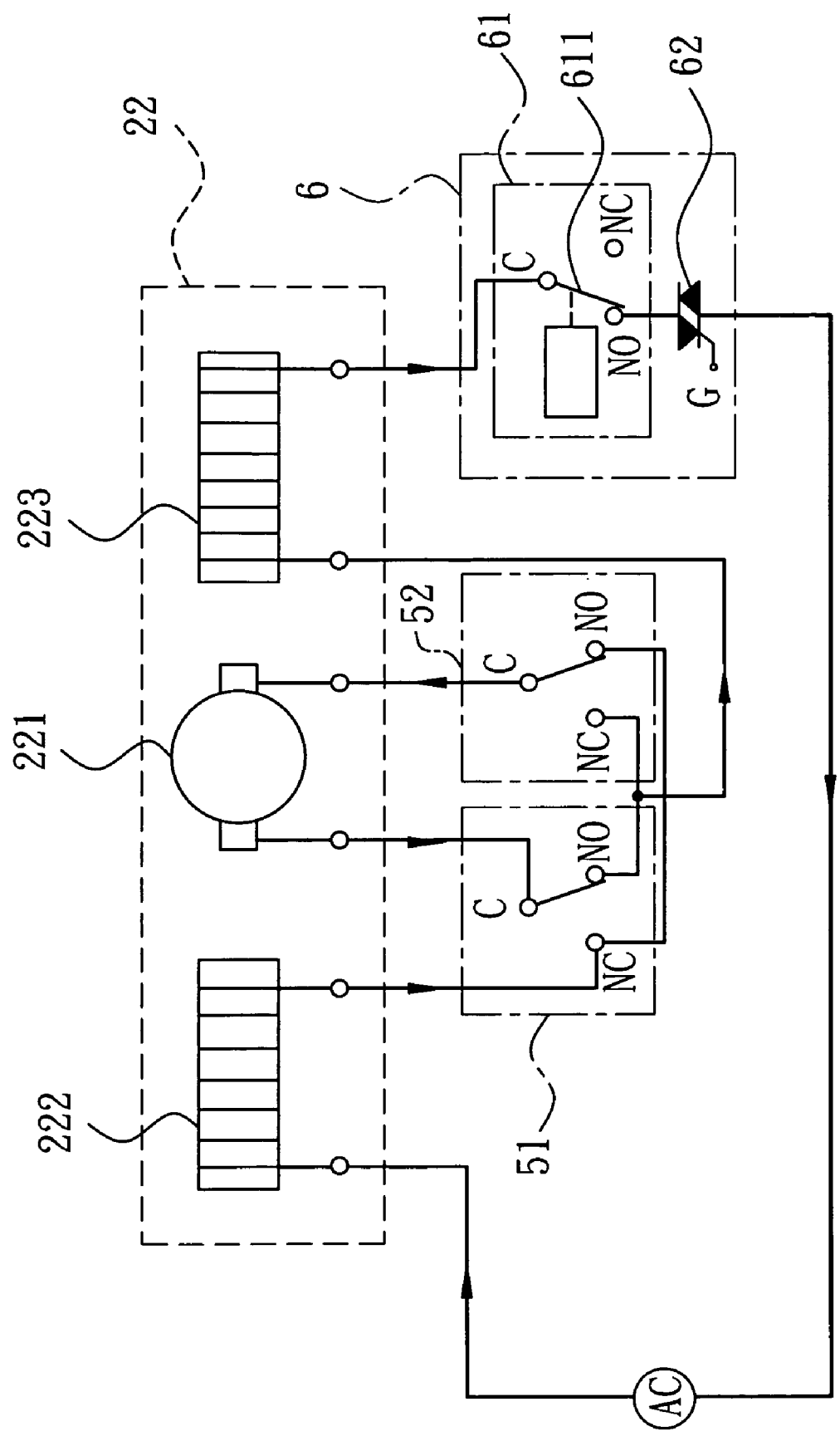
FIG. 7 is a schematic circuit diagram illustrating the motor unit, the polarity switch unit and the power control unit when the control module is operated in a braking mode.

The polarity switching unit 5 is adapted to be connected electrically to the motor unit 22, and is connected electrically to the control module 4. The control module 4 controls the polarity switching unit 5 to provide a first current path for an input power signal, such as an alternating current signal (AC), through the motor unit 22 when the control module 4 is operated in the processing mode, as best shown in FIG. 6. The control module 4 further controls the polarity switching unit 5 to provide a second current path for the input power signal through the motor unit 22 when the control module 4 is operated in the braking mode, as best shown in FIG. 7. In this embodiment, the polarity switching unit 5 includes first and second switches 51, 52, each of which has a common node (C), a first switch node (NC) and a second switch node (NO). The common nodes (C) of the first and second switches 51, 52 are connected respectively to opposite ends of the rotor coil unit 221. The first switch node (NC) of the first switch 51 is connected to the second switch node (NO) of the second switch 52 and one end of the stator coil unit 222. The second switch node (NO) of the first switch 51 is connected to the first switch node (NC) of the second switch 52 and one end of the stator coil unit 223. As such, when the control module 4 is operated in the processing mode, the polarity switching unit 5 is controlled by the control module 4 so as to provide the first current path indicated by the arrows in FIG. 6, where, for each of the first and second switches 51, 52, the common node (C) is connected to the first switch node (NC) and is disconnected from the second switch node (NO). On the other hand, when the control module 4 is operated in the braking mode, the polarity switching unit 5 is controlled by the control module 4 so as to provide the second current path indicated by the arrows in FIG. 7, where, for each of the first and second switches 51, 52, the common node (C) is disconnected from the first switch node (NC) and is connected to the second switch node (NO).

Figures 8A, 8B:
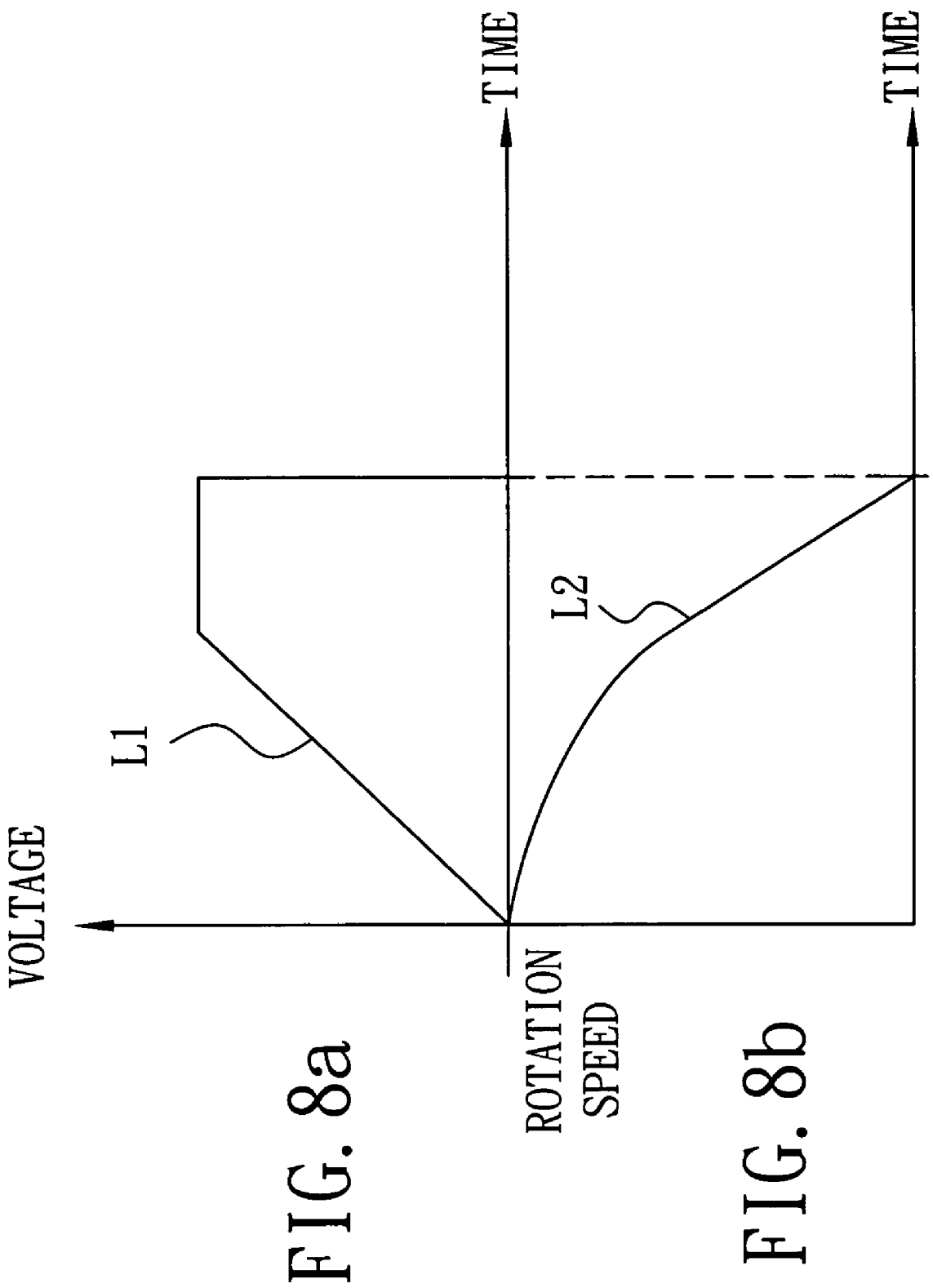
FIGS. 8a and 8b are plots illustrating respectively a voltage provided by the control module to the motor unit, and a rotation speed of the motor unit corresponding to the voltage during a braking period when the control module is operated in the braking mode.

The power control unit 6 is adapted to be connected electrically to the motor unit 22, and is connected electrically to the control module 4. The control module 4 controls the power control unit 6 such that the power control unit 6 reduces an amount of the input power signal that flows through the second current path during a braking period when the control module 4 is operated in the braking mode. In this embodiment, the power control unit 6 includes a trigger component 62, such as a thyristor, with a variable conduction angle, and a normally-open switch 61, such as a relay, adapted to be connected electrically to the other end of the stator coil unit 223 of the motor unit 22 and connected electrically to the trigger component 62. The control module 4 controls the conduction angle of the trigger component 62 so as to reduce the amount of the input power signal that flows through the second current path during the braking period when the control module 4 is operated in the braking mode. In other words, the control module 4 control the conduction angle of the trigger component 62 to provide a gradually increasing ramp voltage, as indicated by the curve (L1) in FIG. 8a, so that a rotation speed of the motor unit 22 corresponding to the ramp voltage is obtained as indicated by the curve (L2) in FIG. 8b, thereby ensuring a smooth and stable braking effect for the motor unit 22.

It is noted that vibration occurs at the start of the braking period when the motor unit 22 is operated at a high speed. To overcome this problem, the control module 4 further controls the switch 61 of the power control unit 6 so as to break the second current path for a predetermined time period, such as a time period of about 0.5 second, at the start of the braking period when the control module 4 is operated in the braking mode. Then, the control module 4 provides the ramp voltage as indicated by the curve (L3) in FIG. 9a so that a rotation speed of the motor unit 22 corresponding to the voltage is obtained as indicated by the curve (L4) in FIG. 9b, thereby also obtaining a smooth and stable braking effect for the motor unit 22.

The rectifying unit 7 rectifies the input power signal so as to generate a DC output (Vcc) that is supplied to the control module 4, the polarity switching unit 5 and the power control unit 6.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A control device for a motor unit of a food processor, the food processor including a cutting blade unit driven by the motor unit, said control device comprising:

a control module operable in a processing mode and a braking mode;

a polarity switching unit adapted to be connected electrically to the motor unit and connected electrically to said control module, said control module controlling said polarity switching unit to provide a first current path for an input power signal through the motor unit when said control module is operated in the processing mode, said control module further controlling said polarity switching unit to provide a second current path for the input power signal through the motor unit when said control module is operated in the braking mode; and a power control unit adapted to be connected electrically to the motor unit and connected electrically to said control module, said control module controlling said power control unit such that said power control unit reduces an amount of the input power signal that flows through the second current path during a braking period when said control module is operated in the braking mode.

2. The control device as claimed in claim 1, wherein said power control unit includes a trigger component with a variable conduction angle.

3. The control device as claimed in claim 2, wherein said control module controls the conduction angle of said trigger component so as to reduce the amount of the input power signal that flows through the second current path during the braking period when said control module is operated in the braking mode.

4. The control device as claimed in claim 3, wherein said control module provides a gradually increasing ramp voltage to control the conduction angle of said trigger component during the braking period.

5. The control device as claimed in claim 2, wherein said trigger component includes a thyristor.

6. The control device as claimed in claim 2, wherein said power control unit further includes a switch connected electrically to and controlled by said control module so as to break the second current path for a predetermined time period at the start of the braking period when said control module is operated in the braking mode.

7. A control device for an alternating current series motor having stator and rotor coil units, said control device comprising:

a control module operable in a processing mode and a braking mode;

a polarity switching unit adapted to interconnect electrically the stator and rotor coil units and connected electrically to said control module, said control module controlling said polarity switching unit to provide a first current path for an input power signal through the stator and rotor coil units when said control module is operated in the processing mode, said control module further controlling said polarity switching unit to reverse polarity connections of the rotor coil unit with the stator coil unit so as to result in a second current path for the input power signal through the stator and rotor coil units when said control module is operated in the braking mode; and a power control unit adapted to be connected electrically to the alternating current series motor and connected electrically to said control module, said control module controlling said power control unit such that said power control unit reduces an amount of the input power signal that flows through the second current path during a braking period when said control module is operated in the braking mode.

8. The control device as claimed in claim 7, wherein said power control unit includes a trigger component with a variable conduction angle.

9. The control device as claimed in claim 8, wherein said control module controls the conduction angle of said trigger component so as to reduce the amount of the input power signal that flows through the second current path during the braking period when said control module is operated in the braking mode.

10. The control device as claimed in claim 9, wherein said control module provides a gradually increasing ramp voltage to control the conduction angle of said trigger component during the braking period.

11. The control device as claimed in claim 8, wherein said trigger component includes a thyristor.

12. The control device as claimed in claim 8, wherein said power control unit further includes a switch connected electrically to and controlled by said control module so as to break the second current path for a predetermined time period at the start of the braking period when said control module is operated in the braking mode.

* * * * *